(12) United States Patent
Kang

(10) Patent No.: US 8,397,588 B2
(45) Date of Patent: Mar. 19, 2013

(54) TORQUE ANGLE SENSOR AND ELECTRONIC POWER STEERING APPARATUS HAVING THE SAME

(75) Inventor: Rae-cheong Kang, Osan-si (KR)

(73) Assignee: Mando Corporation, Gyeonggi-do (KR)

( * ) Notice: Subject to any disclaimer, the term of this patent is extended or adjusted under 35 U.S.C. 154(b) by 317 days.

(21) Appl. No.: 12/835,378

(22) Filed: Jul. 13, 2010

(65) Prior Publication Data

US 2011/0011667 A1   Jan. 20, 2011

(30) Foreign Application Priority Data

Jul. 15, 2009 (KR) .................. 10-2009-0064518

(51) Int. Cl.
*G01L 3/00* (2006.01)
(52) U.S. Cl. .................................. 73/862.08
(58) Field of Classification Search ............ 73/760, 73/862.08
See application file for complete search history.

(56) References Cited

U.S. PATENT DOCUMENTS

| | | | | |
|---|---|---|---|---|
| 4,633,702 | A * | 1/1987 | Kaiser et al. ................. | 73/9 |
| 5,417,551 | A * | 5/1995 | Abe et al. ..................... | 417/203 |
| 6,474,428 | B1 * | 11/2002 | Fujikawa et al. ............ | 180/65.25 |
| 7,406,884 | B2 * | 8/2008 | Jerems et al. ............... | 73/862.331 |
| 7,663,279 | B2 * | 2/2010 | Tsai et al. .................... | 310/90 |
| 7,726,208 | B2 * | 6/2010 | Hoeller et al. ............... | 73/862.331 |
| 2004/0056748 | A1 * | 3/2004 | Masaki et al. ............... | 336/119 |
| 2006/0081070 | A1 * | 4/2006 | Madni et al. ................ | 73/862.325 |
| 2011/0247408 | A1 * | 10/2011 | Lee .............................. | 73/117.02 |

* cited by examiner

*Primary Examiner* — Max Noori
(74) *Attorney, Agent, or Firm* — McDermott Will & Emery LLP

(57) ABSTRACT

Disclosed is a torque angle sensor and an electronic power steering apparatus having the torque angle sensor, which includes an upper case, an upper side of which is assembled with a sensor housing, a rotor assembled with an inside of the upper case, the rotor fitted around an outer surface of the output shaft extending through the rotor and assembled with an inside of the upper case, a lower case, a lower side of which is assembled with a spacer cover, and a middle case assembled between the upper case and the lower case. The upper case includes holding parts opposed to each other and formed on an upper surface of the upper case, which is assembled with the sensor housing, and a seating spring protruding downward with inclination from an end of one of the holding parts and elastically bent when the upper case is assembled with the sensor housing. Therefore, it is possible to remove a circumferential clearance and an axial circumferential clearance during assembling of the torque angle sensor with peripheral elements and can absorb movement created by an impact, so as to effectively prevent breakage and misoperation of the elements included in the torque angle sensor and facilitate the assembling of the electronic power steering apparatus.

8 Claims, 9 Drawing Sheets

TORQUE ANGLE SENSOR AND ELECTRONIC POWER STEERING APPARATUS HAVING THE SAME

BACKGROUND OF THE INVENTION

1. Field of the Invention

The present invention relates to a torque angle sensor and an electronic power steering apparatus having the torque angle sensor. More particularly, the present invention relates to a torque angle sensor and an electronic power steering apparatus having the torque angle sensor, which can remove a circumferential clearance and an axial circumferential clearance during assembling of the torque angle sensor with peripheral elements and can absorb movement created by an impact, so that it is possible to prevent breakage and mis-operation of the elements included in the torque angle sensor and to facilitate the assembling of the electronic power steering apparatus.

2. Description of the Prior Art

A vehicle generally uses a power steering apparatus serving as a means for reducing steering power of a steering wheel (handle) and guaranteeing stability of a steering state. In this respect, a conventional Hydraulic Power Steering system (HPS) using hydraulic pressure has been widely used for the HPS of the vehicle. However, in contrary to the conventional scheme of using the hydraulic pressure, an Electronic Power Steering System (EPS) that makes steering performance of a driver easy using rotational force of a motor and is environment-friendly has been widely installed in vehicles recently.

Such an EPS drives a motor by means of an electronic control unit according to a driving condition of a vehicle sensed in a vehicle speed sensor, steering angle sensor, steering torque sensor, or the like, so that it provides a light and comfortable steering sense in low-speed driving, a heavy steering sense and satisfactory direction stability in high-speed driving, and restoration force for promptly restoring the steering wheel according to a rotation angle of the steering wheel. Therefore, the EPS enables the prompt steering in an emergency so that it provides the driver with an optimum steering condition.

Meanwhile, in the EPS, the motor is installed in an external side of a steering column that is located between the steering wheel and a gear box so as to downwardly transfer the rotational force of the steering wheel of the driver so that it rotates a steering shaft within the steering column, thereby complementing steering power of the driver according to the steering of the steering wheel.

FIG. 1 is a view schematically illustrating a conventional electronic power steering apparatus. As shown in FIG. 1, the electronic power steering apparatus 100 includes a steering system 130 extending from a steering wheel 102 to wheels 126 in both sides and an auxiliary power mechanism 140 for supplying steering auxiliary power to the steering system 130.

The steering system 130 includes a steering shaft 106, of which one side is connected to the steering wheel 102 to rotate together with the steering wheel 102 and the other side is connected to a pinion shaft 108 through a pair of universal joints 104. Further, the pinion shaft 108 is connected to a rack bar 112 through a rack-pinion mechanism part 110 and both ends of the rack bar 112 are connected to the wheels 126 of a vehicle through a tie road 112 and a knuckle arm 124.

The auxiliary power mechanism 140 includes a torque sensor 142 for sensing torque applied to the steering wheel 102 by the driver and outputting an electric signal proportional to the sensed torque, an electric control unit 144 for generating a control signal based on the electric signal transferred from the torque sensor 142, a motor 146 for generating auxiliary power based on the control signal transferred from the electric control unit 144, and a reducer 150 including a worm gear 152 and a worm wheel gear 156 for transferring the auxiliary power generated in the motor 146 to the steering shaft 106.

Depending on the case, either the torque sensor 142 or the angle sensor 143 may be provided at one side of the worm wheel gear 156, or both of the torque sensor 142 and the angle sensor 143 may be provided at one side of the worm wheel gear 156, to construct the electronic power steering apparatus 100.

Recently, when the torque sensor and the angle sensor are assembled with the steering shaft, respectively, there is a problem in that the volume of the electronic power steering apparatus increases and the manufacturing cost and the assembling processes increase. In this respect, a torque angle sensor having the unified function of the torque sensor and the angle sensor has been developed.

However, the torque angle sensor having the unified function of the torque sensor and the angle sensor includes a lot of precision components, so that when the torque angle sensor is mounted to the steering shaft, the torque angle sensor creates problems of generating malfunction due to the clearance in a circumferential direction or an axial direction, or damaging the included components or generating malfunction due to even a light impact transferred from the outside.

SUMMARY OF THE INVENTION

Accordingly, the present invention has been made to solve the above-mentioned problems occurring in the prior art, and the present invention provides a torque angle sensor and an electronic power steering apparatus having the torque angle sensor, which can remove a circumferential clearance and an axial circumferential clearance during assembling of the torque angle sensor with peripheral elements and can absorb movement created by an impact, so that it is possible to prevent breakage and mis-operation of the elements included in the torque angle sensor and to facilitate the assembling of the electronic power steering apparatus.

In accordance with an aspect of the present invention, there is provided a torque angle sensor including: an upper case, through a central part of which an input shaft and an output shaft extend and are assembled with each other, an upper side of the upper case being assembled with a sensor housing, the upper case including a fastening means for fastening the upper case to the sensor housing; a rotor assembled with an inside of the upper case, the rotor fitted around an outer surface of the output shaft extending through the rotor; a middle case assembled with a lower side of the upper case; and a lower case, an upper side of which is assembled with a lower side of the middle case, and a lower side of which is assembled with a spacer cover.

In accordance with an aspect of the present invention, there is provided an electronic power steering apparatus including: the torque angle sensor, an electronic control device for computing a signal inputted from the torque angle sensor and transmitting an output signal to a motor; the motor for receiving the signal from the electronic control device and generating steering auxiliary power; a worm gear assembled with the motor; and a worm wheel gear teeth-assembled with the worm gear and transferring the steering auxiliary power transferred from the motor to a steering shaft.

According to the present invention, it is possible to remove a circumferential clearance and an axial circumferential clearance during assembling of the torque angle sensor with peripheral elements and can absorb movement created by an impact, so as to effectively prevent breakage and mis-operation of the elements included in the torque angle sensor and facilitate the assembling of the electronic power steering apparatus.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
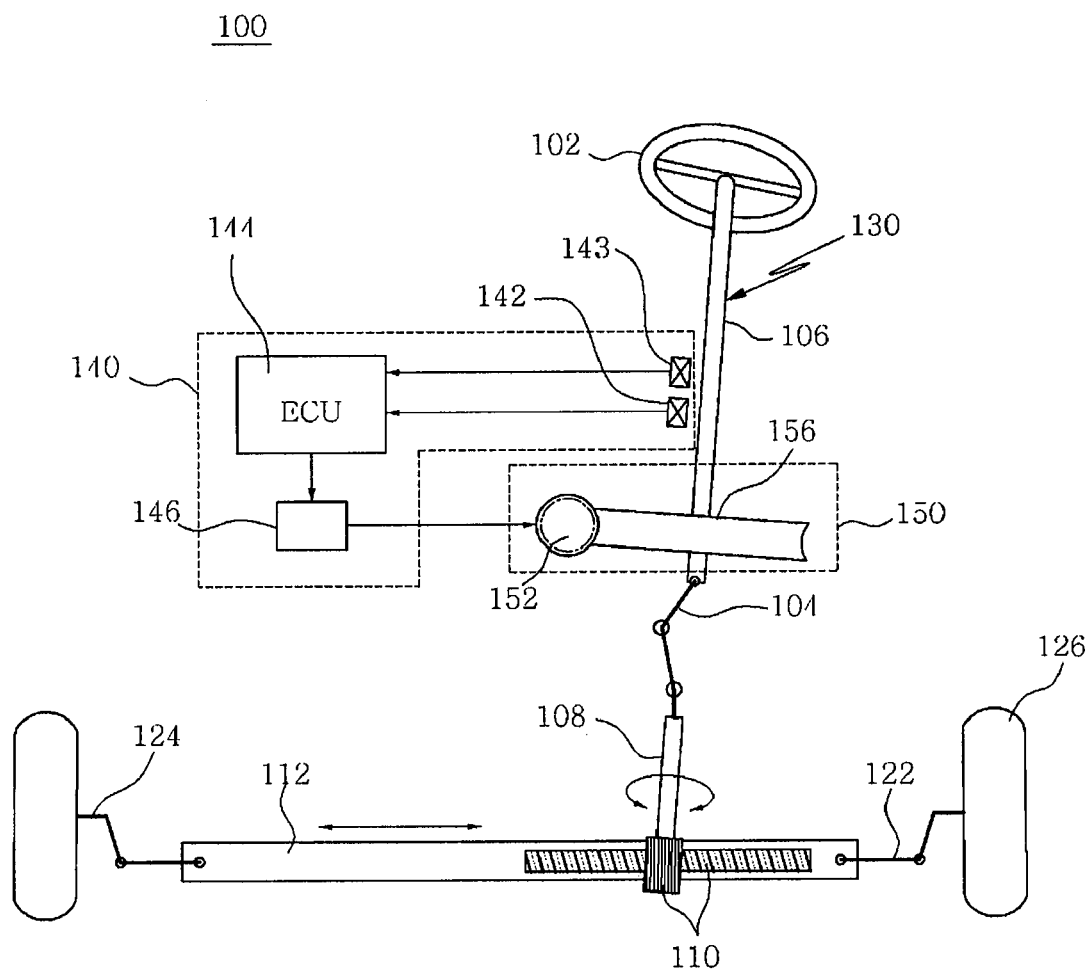
FIG. 1 is a view schematically illustrating a conventional electronic power steering apparatus.

Hereinafter, preferred embodiments of the present invention will be described with reference to the accompanying drawings. In the following description, the same elements will be designated by the same reference numerals although they are shown in different drawings. In the following description, detailed explanation of known related functions and constitutions may be omitted to avoid unnecessarily obscuring the subject manner of the present invention.

Figure 2:
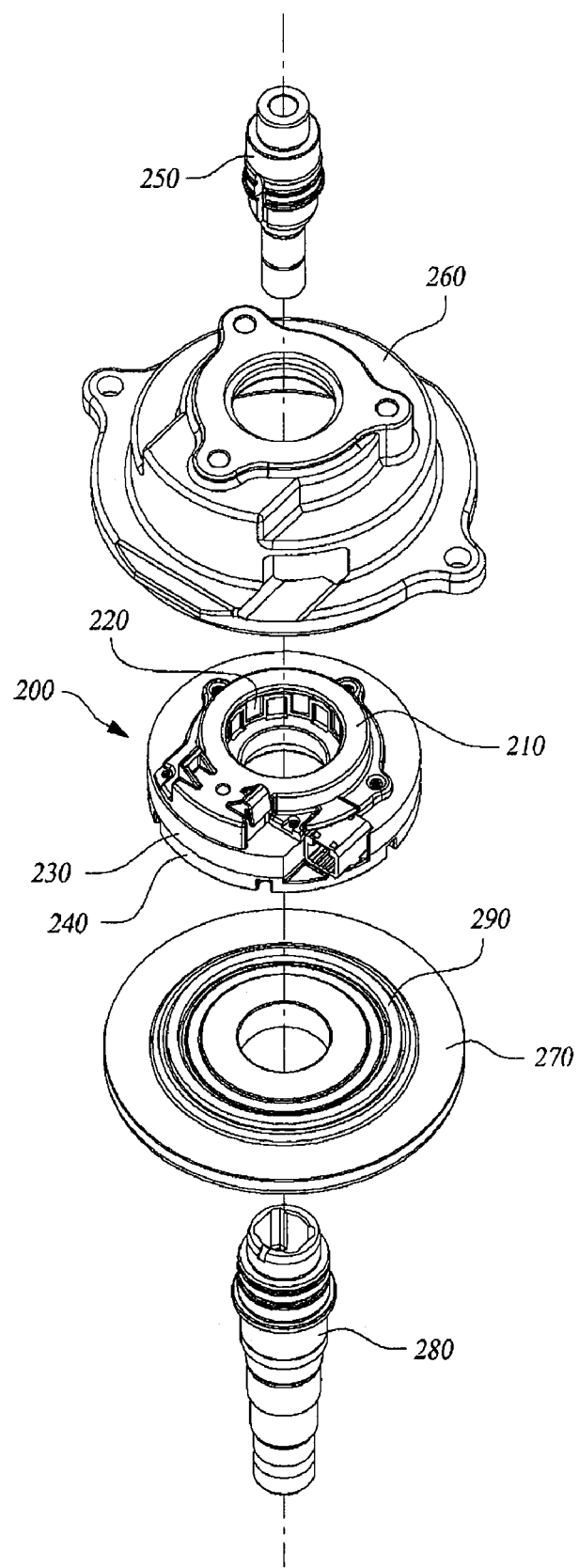
FIG. 2 is an exploded perspective view illustrating an assembling relation between a torque angle sensor and peripheral elements according to an embodiment of the present invention.
Figure 3:
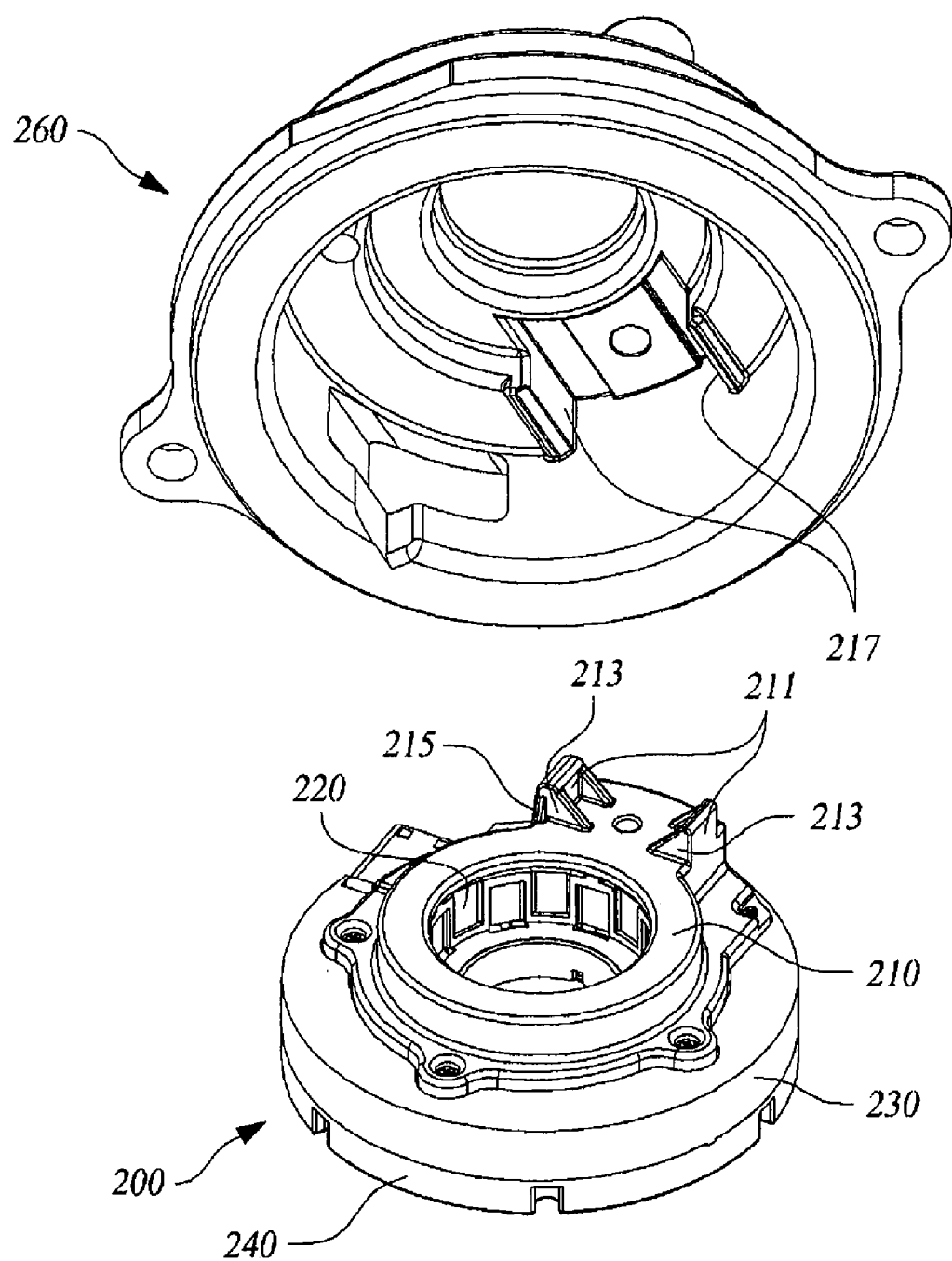
FIGS. 3 and 4 are an exploded perspective view and a cross-sectional view illustrating an assembling relation between a torque angle sensor and a sensor housing according to an embodiment of the present invention, respectively.
Figure 4:
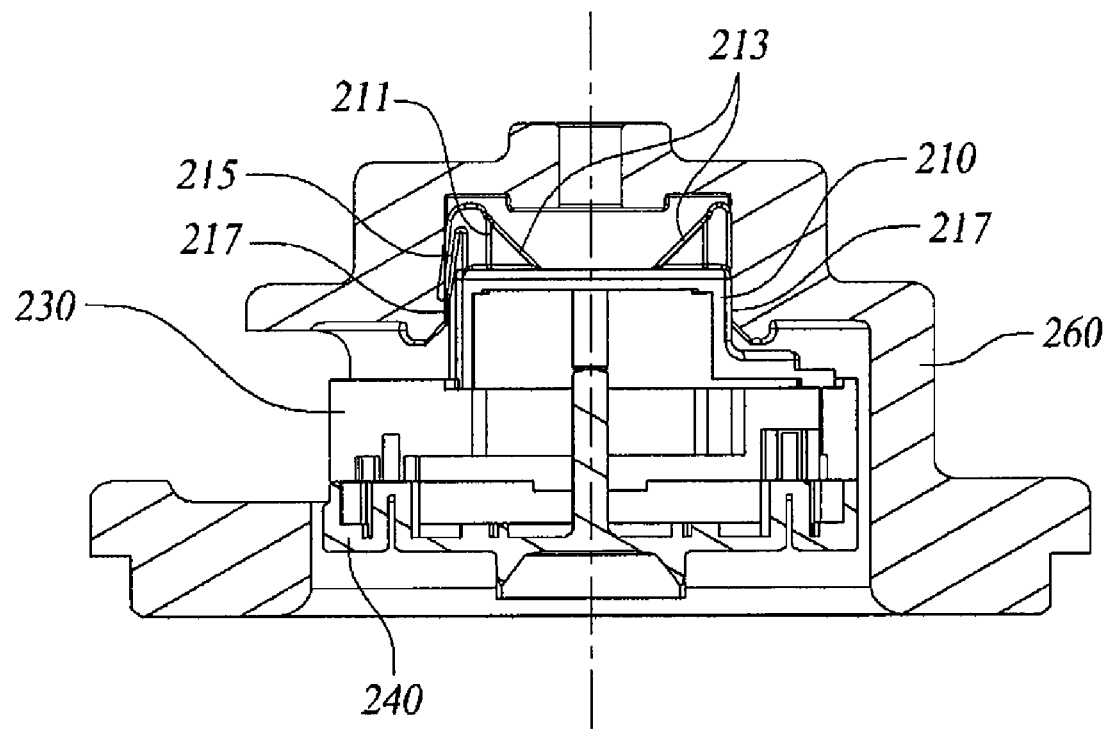
Figure 5:
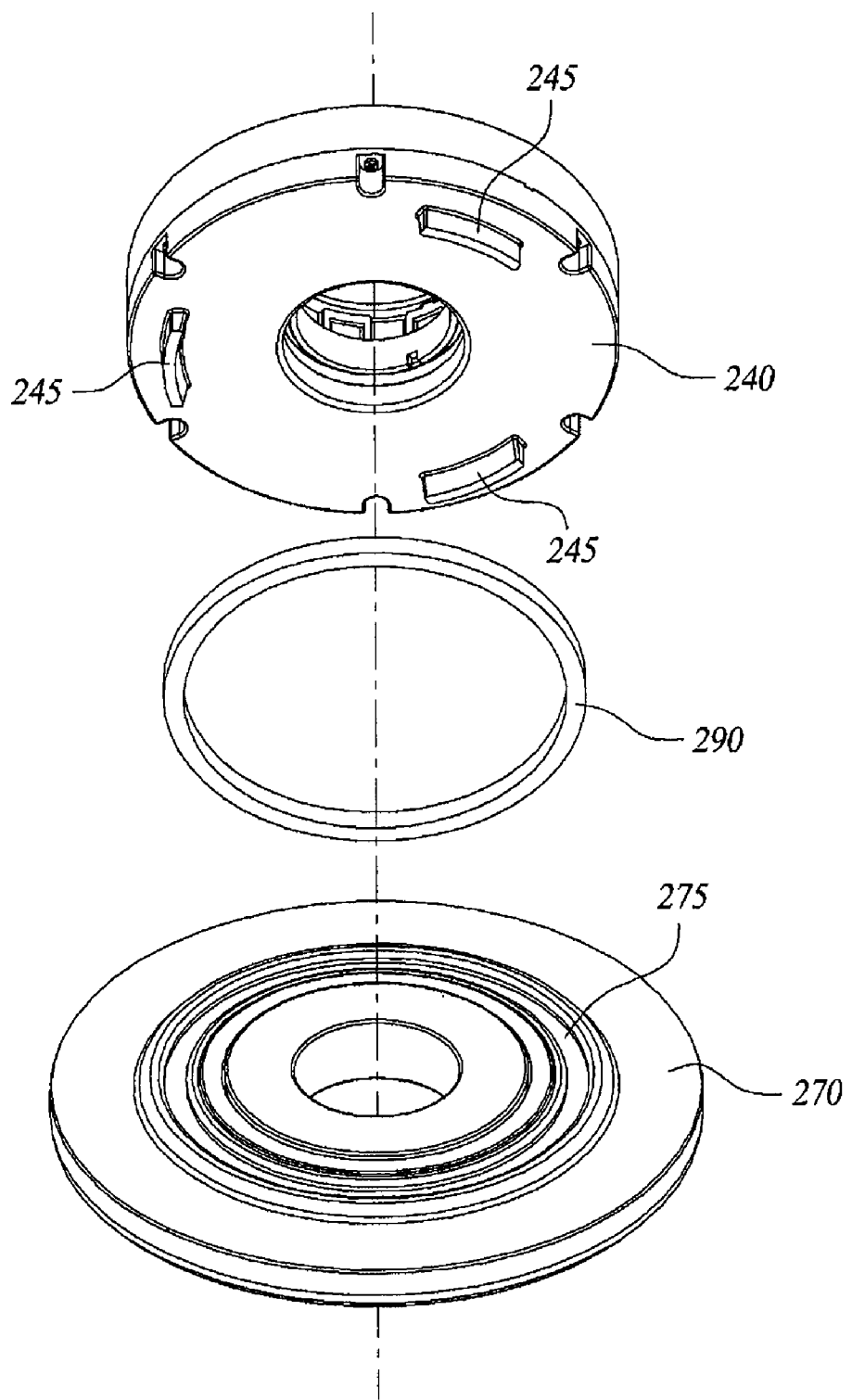
FIGS. 5 and 6 are an exploded perspective view and a cross-sectional view illustrating an assembling relation between a torque angle sensor and a spacer cover according to an embodiment of the present invention, respectively.
Figure 6:
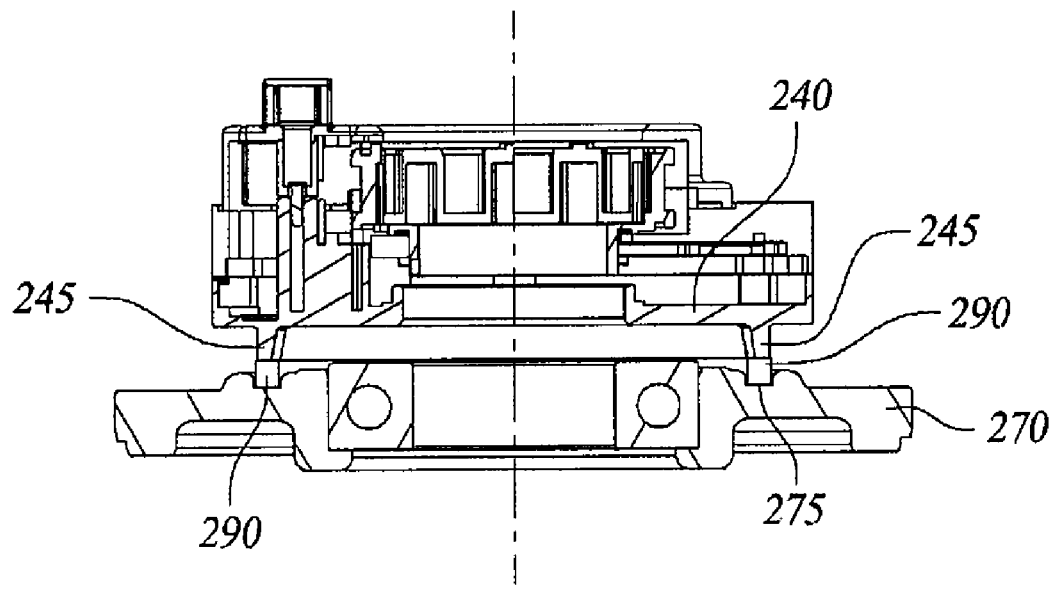
Figure 7:
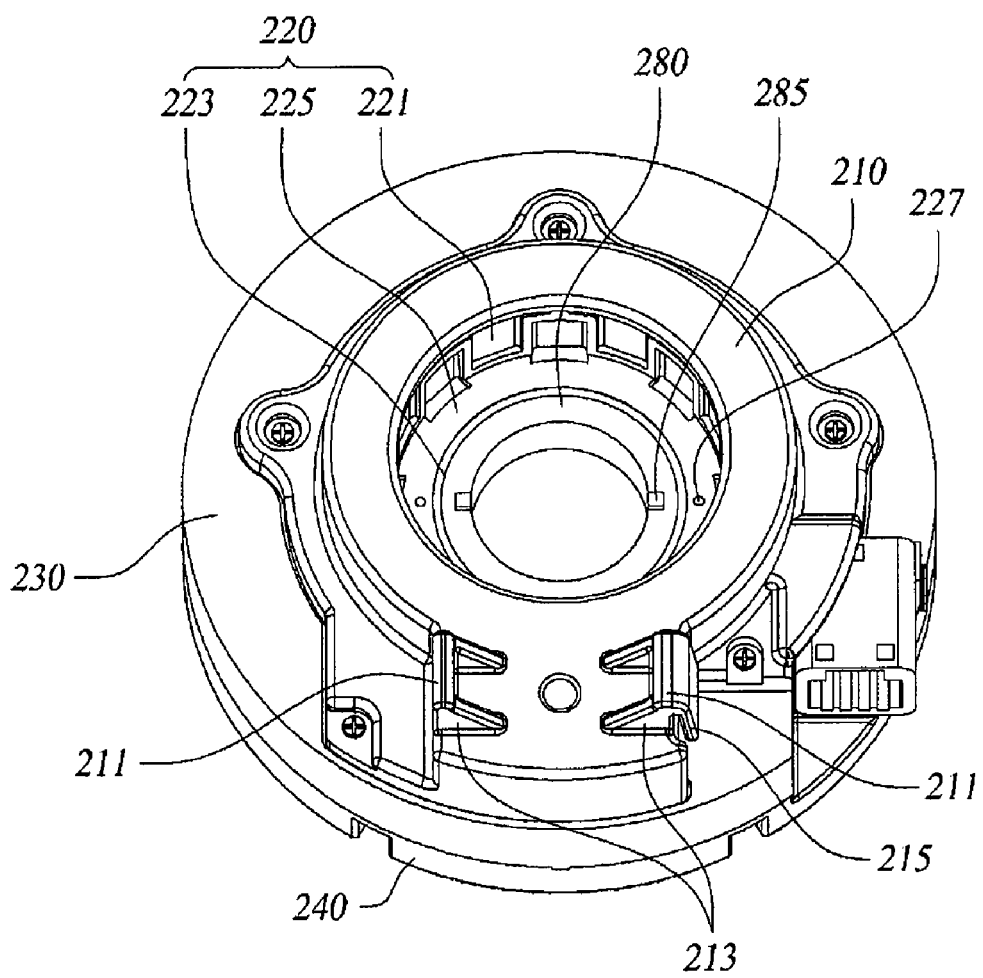
FIGS. 7 and 8 are a perspective view and a cross-sectional view illustrating a torque angle sensor according to an embodiment of the present invention.
Figure 8:
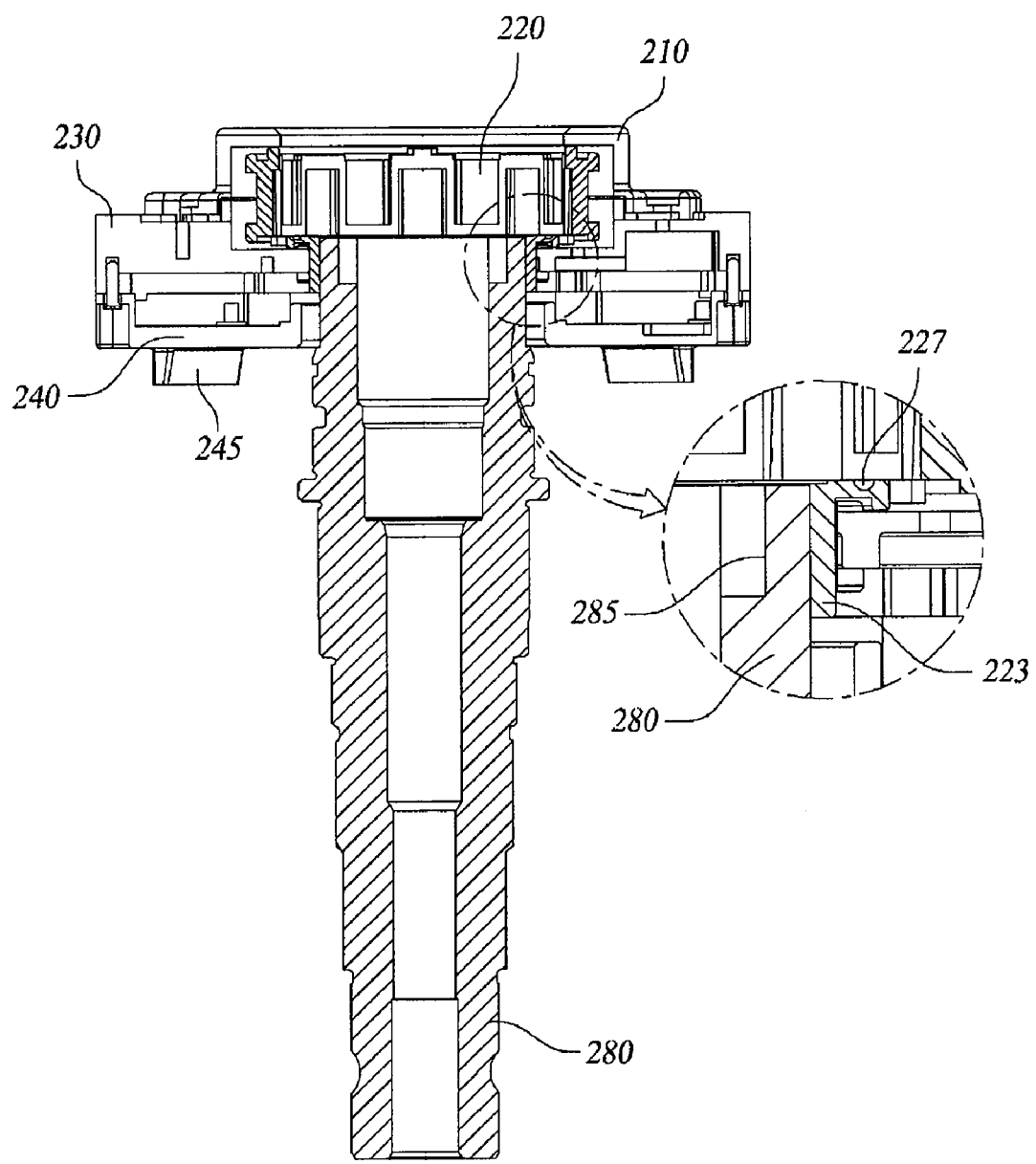
Figure 9:
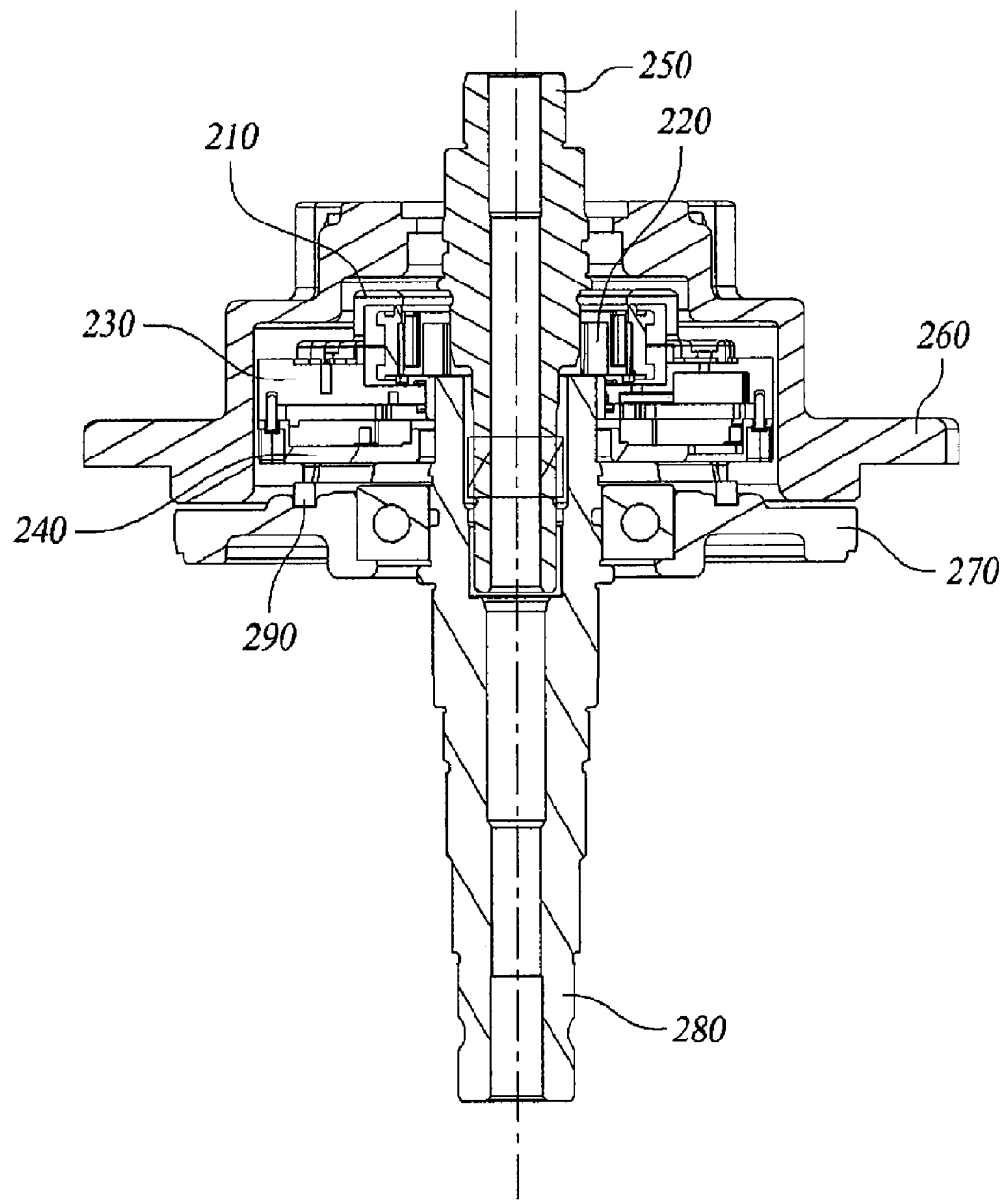
FIG. 9 is a cross-sectional view illustrating an assembling relation between a torque angle sensor and peripheral elements according to an embodiment of the present invention.

FIG. 2 is an exploded perspective view illustrating an assembling relation between a torque angle sensor and peripheral elements according to an embodiment of the present invention, FIGS. 3 and 4 are an exploded perspective view and a cross-sectional view illustrating an assembling relation between a torque angle sensor and a sensor housing according to an embodiment of the present invention, respectively, FIGS. 5 and 6 are an exploded perspective view and a cross-sectional view illustrating an assembling relation between a torque angle sensor and a spacer cover according to an embodiment of the present invention, respectively, FIGS. 7 and 8 are a perspective view and a cross-sectional view illustrating a torque angle sensor according to an embodiment of the present invention, and FIG. 9 is a cross-sectional view illustrating an assembling relation between a torque angle sensor and peripheral elements according to an embodiment of the present invention.

As illustrated in the drawings, a torque angle sensor 200 according to an embodiment of the present invention includes an upper case 210, a rotor 220, a middle case 230, and a lower case 240. The upper case 210 has a central part, through which an input shaft 250 and an output shaft 280 extend and assembled with each other and are fitted in the center of the upper case 210, and an upper side of the upper case 210 assembled with a sensor housing 260. Further, the upper case 210 includes a fastening means for fastening the upper case 210 to the sensor housing 260. The rotor 220 is assembled with an inside of the upper case 210 and fitted around an outer surface of the output shaft 280 extending through the rotor 220. The middle case 230 is assembled with a lower side of the upper case 210. The lower case 240 is assembled with a lower side of the middle case 230 and a lower side of the lower case 240 is assembled with a spacer cover 270.

Further, the electronic power steering apparatus according to an embodiment of the present invention includes the torque angle sensor 200, an electronic control device (refer to reference number 144 of FIG. 1) computing a signal input from the torque angle sensor 200 and transmitting an output signal to the motor, a motor (refer to reference number 146 of FIG. 1) receiving the signal from the electronic control device and generating steering auxiliary power, a worm gear (refer to reference number 152 of FIG. 1) assembled with the motor, and a worm wheel gear (refer to reference number 156 of FIG. 1) teeth-assembled with the worm gear, to transfer the steering auxiliary power transferred from the motor to a steering shaft.

The rotor 220 includes a large diameter portion 221 included in an inside of the upper case 210 and generating a magnetic field, a small diameter portion 223 having a decreased diameter from the large diameter portion 221, and a stepped portion 225 connecting the large diameter portion 221 and the small diameter portion 223.

The fastening means, which is formed at the upper case 210 and fixes the upper case 210 to the sensor housing 260, includes holding parts 211 and a seating spring 125. The holding parts 211 are opposed to each other and formed on the upper surface of the upper case 210, which is assembled with the sensor housing 260. The seating spring 125 protrudes downward from one holding part of the two holding parts 211 and is elastically bent when the upper case is assembled with the sensor housing 260.

The seating spring 215 extends downward with an inclination from an end of one holding part 211, while it can be elastically bent. The lower case 240 includes protrusions 245 formed on a lower surface of the lower case, which is seated on the spacer cover 270. Each of the protrusions 245 has a shape of a circumferentially extending rib and protrudes in a direction parallel to the axis. An elastic member 290 can be assembled between the protrusions 245 of the lower case 240 and the spacer cover 270.

Further, the rotor 220 includes location identification parts 227, each having a shape of a recess, on an upper side of the stepped portion 225. The output shaft 280 has slits 285 formed at an end of the output shaft, which is forcedly inserted in the small diameter portion 223. Therefore, it is possible to adjust a setting angle while the output shaft 280 is forcedly inserted in the rotor 220.

The torque angle sensor 200 includes the upper case 210, the upper side of which is assembled with the sensor housing 260, the rotor 220 assembled with the inside of the upper case 210, the lower case 240, the lower side of which is assembled with the spacer cover 270, and the middle case 230 assembled between the upper case 210 and the lower case 240. The input shaft 250 is inserted to the upper side and the output shaft 280 is inserted to the lower side of the center of the torque angle sensor 200.

The rotor 220 is inserted to the inside of the upper case 210, so that the upper case 210 is assembled with the upper surface of the middle case 230 by the fastening member, such as a screw. Further, the upper side of the upper case 210 is assembled with the sensor housing 260 protecting the built-in elements. In order to prevent the circumference-directional clearance of the upper case 210 and the sensor housing 260, the upper case 210 includes the holding parts 211 and the fastening means including the seating spring 215 on the upper surface thereof, which is assembled with the sensor housing 260.

That is, the holding parts 211 are formed on the upper surface of the upper case 210 in a vertical direction while being opposed to each other. Further, the rib-shaped seating spring 215 is formed at the end of one holding part 211 of the opposed holding parts 211 while protruding downward, so that it is elastically bent when the upper case 210 is assembled with the sensor housing 260.

Further, the holding parts 211 can include reinforcement ribs 213 in both sides in order to reinforce the strength of the holding parts 211.

Therefore, when the holding parts 211 of the upper case 210 are inserted to a coupling part 217 formed at an inside of the sensor housing 260 during the assembling of the upper case 210 with the sensor housing 260, the seating spring 215 is elastically bent so that the upper case 210 is in close contact and assembled with the sensor housing 260.

Herein, the seating spring 215 can integrally extend downward with an inclination from the end of one of the opposed holding parts 211.

The lower case 240 is assembled with the lower surface of the middle case 230 by the fastening means, such as a screw, and the lower side of the lower case 240 is assembled with the spacer cover 270, which holds the output shaft 280 and a bearing. In order to absorb an axial-directional impact transferred from the outside and prevent breakage of the internal elements, the lower case 240 includes the protrusions 245 formed on the lower surface of the lower case 240, which is seated on the spacer cover 270, and is assembled with the spacer cover 270 by means of the elastic member 290.

That is, the circular arc-shaped protrusions 245 vertically extend in the axial direction on the lower surface of the lower case 240 of the lower case 240, which is seated on the spacer cover 270, and the spacer cover 270 includes a seating recess 275 shaped like a circular arc-shaped depression at a location corresponding to that of the protrusion 245. Therefore, the elastic member 290 made of an elastic material is inserted in the seating recess 275.

Therefore, the protrusions 245 of the lower case 240 are seated on the elastic member 290 inserted in the seating recess 275 of the spacer cover 270, so that the lower case 240 is assembled with the spacer cover 270, thereby absorbing the impact in the axial direction.

The upper side of the middle case 230 is fastened to the upper case 210 and the lower side of the middle case 230 is fastened to the lower case by the fastening member, such as a screw. The rotor 220 is included between the upper side of the middle case 230 and the upper case 210. The output shaft 280 and the input shaft 250 forcedly inserted to the output shaft 280 extend through the inside center of the middle case 230 and are fitted in the inside of the middle case 230.

In the meantime, the rotor 220 is fitted around the outer surface of the output shaft 280 extending through the rotor 220 and is built in and assembled with the inside of the upper case 210. Here, the rotor 220 includes the large diameter portion 221 generating a magnetic field, the small diameter portion 223 having a decreased diameter from the large diameter portion 221, and the stepped portion 225 connecting the large diameter portion 221 and the small diameter portion 223. Therefore, the output shaft 280 is forcedly inserted into the inner surface of the small diameter portion 223, so that the rotor 220 is assembled with the output shaft 280.

The stepped portion 225 of the rotor 220 includes the location identification parts 227, each of which having a shape of a recess, a protrusion, etc., on the upper surface of the stepped portion 225, and the output shaft 280 has the slits 285 on the end of the output shaft 280, which is forcedly inserted into the small diameter part 223 of the rotor 220. Therefore, it is possible to adjust the setting angle when the output shaft 280 is forcedly inserted into the rotor 220.

According to FIGS. 7 and 8, two location identification parts 227 are provided at the rotor 220 and two slits 285 are provided at the output shaft 280, but the number of location identification parts 227 and the output shafts 280 are not limited thereto and may be at least one, respectively.

In the electronic power steering apparatus including the torque angle sensor according to the embodiment of the present invention, the property that the electronic control device computes a change of the magnetic field inputted from the torque angle sensor, generates the output signal, and transmits the generated output signal, so that the electronic power steering apparatus receives the auxiliary steering power through the driving of the motor is identical to the conventional one, so that its detailed description will be omitted.

Further, the present invention can be usefully applied to the measurement of the torque and the angle applied between any two shafts, as well as the electronic power steering apparatus.

According to the present invention having the aforementioned structure and shape, it is possible to remove the clearance in the circumferential direction and the axial direction and absorb the movement created by the impact during the assembling of the torque angle sensor with the peripheral elements, thereby preventing the breakage and mis-operation of the elements included in the torque angle sensor and facilitating the assembling of the electronic power steering apparatus.

Even though it was described in the above that all of the components of an embodiment of the present invention are coupled as a single unit or coupled and operated as a single unit, the present invention is not limited to such an embodiment. That is, within the purpose of the present invention, all of the components may be selectively coupled and operated as one or more units.

In addition, since terms, such as "comprising," "including," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are defined otherwise. A term ordinarily used like that defined by a dictionary shall be construed that it has a meaning equal to that in the context of a related description, and shall not be construed in an ideal or excessively formal meaning unless it is clearly defined in the present specification.

Although exemplary embodiments of the present invention have been described for illustrative purposes, those skilled in the art will appreciate that various modifications, additions and substitutions are possible, without departing from the scope and spirit of the invention as disclosed in the accompanying claims. Therefore, the embodiment disclosed in the present invention is intended to illustrate the scope of the technical idea of the present invention, and the scope of the present invention is not limited by the embodiment. The scope of the present invention shall be construed on the basis of the accompanying claims, and it shall be construed that all of the technical ideas included within the scope equivalent to the claims belong to the present invention.

The invention claimed is:

1. An electronic power steering apparatus, comprising:
a torque angle sensor; an electronic control device configured to compute a signal inputted from the torque angle sensor and transmit an output signal to a motor; the motor configured to receive the signal from the electronic control device and generate steering auxiliary power; a worm gear engaged with the motor; and a worm wheel gear teeth-engaged with the worm gear and configured to transfer the steering auxiliary power generated from the motor to a steering shaft, wherein torque angle sensor, comprises:
a sensor housing;
an upper case, through a central part of which an input shaft and an output shaft extend and are assembled with each other, an upper side of the upper case being engaged with the sensor housing, the upper case comprising a fastening means for fastening the upper case to the sensor housing;
a rotor disposed inside the upper case, the rotor being fitted around an outer surface of the output shaft extending through the rotor;
a middle case engaged with a lower side of the upper case; and
a lower case, an upper side of which is engaged with a lower side of the middle case, and a lower side of which is engaged with a spacer cover,
wherein the lower case comprises protrusions protruding from a lower surface of the lower case.

2. The electronic power steering apparatus as claimed in claim 1, wherein the rotor comprises a large diameter portion disposed at an inside of the upper case, a small diameter portion having a decreased diameter from the large diameter portion, and a stepped portion connecting the large diameter portion and the small diameter portion.

3. A torque angle sensor, comprising:
an upper case through a central part of which an input shaft and an output shaft extend and are assembled with each other, an upper side of the upper case being assembled with a sensor housing, the upper case comprising a fastening means for fastening the upper case to the sensor housing;
a rotor assembled with an inside of the upper case, the rotor fitted around an outer surface of the output shaft extending through the rotor;
a middle case assembled with a lower side of the upper case; and
a lower case, an upper side of which is assembled with a lower side of the middle case, and a lower side of which is assembled with a spacer cover,
wherein the fastening means comprises holding parts opposed to each other and formed on an upper surface of the upper case, which is assembled with the sensor housing, and a seating spring protruding downward from one holding part of the holding parts while the seating spring being elastically bent when the upper case is assembled with the sensor housing.

4. The torque angle sensor as claimed in claim 3, wherein the seating spring is integrally formed with one of the holding parts.

5. The torque angle sensor as claimed in claim 1, wherein an elastic member is assembled between the protrusions of the lower case and the spacer cover.

6. A torque angle sensor, comprising:
an upper case, through a central part of which an input shaft and an output shaft extend and are assembled with each other, an upper side of the upper case being assembled with a sensor housing, the upper case comprising a fastening means for fastening the upper case to the sensor housing;
a rotor assembled with an inside of the upper case and having a stepped portion, the rotor fitted around an outer surface of the output shaft extending through the rotor;
a middle case assembled with a lower side of the upper case; and
a lower case, an upper side of which is assembled with a lower side of the middle case, and a lower side of which is assembled with a spacer cover,
wherein in order to adjust an angle during a forced insertion of the output shaft into the rotor, the rotor comprises location identification parts on an upper surface of the stepped portion and the output shaft comprises slits at an end of the output shaft.

7. An electronic power steering apparatus, comprising:
a torque angle sensor as claimed in claim 3;
an electronic control device configured to compute a signal inputted from the torque angle sensor and transmit an output signal to a motor;
the motor configured to receive the signal from the electronic control device and generate steering auxiliary power;
a worm gear engaged with the motor; and
a worm wheel gear teeth-engaged with the worm gear and configured to transfer the steering auxiliary power generated from the motor to a steering shaft.

8. An electronic power steering apparatus, comprising:
a torque angle sensor as claimed in claim 6;
an electronic control device configured to compute a signal inputted from the torque angle sensor and transmit an output signal to a motor;
the motor configured to receive the signal from the electronic control device and generate steering auxiliary power;
a worm gear engaged with the motor; and
a worm wheel gear teeth-engaged with the worm gear and configured to transfer the steering auxiliary power generated from the motor to a steering shaft.

* * * * *